United States Patent [19]

Mumcu et al.

[11] Patent Number: 4,687,838
[45] Date of Patent: Aug. 18, 1987

[54] PROCESS FOR PREPARING PULVERULENT COATING COMPOSITION BASED UPON POLYAMIDE HAVING AT LEAST 10 ALIPHATICALLY BOUND CARBON ATOMS PER CARBONAMIDE GROUP

[75] Inventors: Salih Mumcu, Marl; Helmut Winzer, Finnentrop, both of Fed. Rep. of Germany

[73] Assignee: Huls Aktiengesellschaft, Marl, Fed. Rep. of Germany

[21] Appl. No.: 840,819

[22] Filed: Mar. 18, 1986

[30] Foreign Application Priority Data

Mar. 23, 1985 [DE] Fed. Rep. of Germany ....... 3510691

[51] Int. Cl.$^4$ .............................................. C08G 69/46
[52] U.S. Cl. ................................... 528/496; 525/432; 528/495; 528/310; 528/323; 528/326
[58] Field of Search ............... 528/496, 495, 326, 323, 528/310; 525/432

[56] References Cited

U.S. PATENT DOCUMENTS 4,334,056  6/1982  Meyer et al. ........................ 528/495

Primary Examiner—Harold D. Anderson
Attorney, Agent, or Firm—Quaintance, Murphy & Presta

[57] ABSTRACT

The invention concerns an improved precipitation process in the manufacture of coating powders based on polyamides having at least ten aliphatically bound carbon atoms per carbonamide group. Rapid cooling takes place with stirring mainly by distilling the ethanol solvent until the temperature of precipitation is set in the range from 90° to 113° C. With the beginning of the saturation limit (about 125° C.), the temperature difference between the coolant in the jacket and the solution inside is maintained at most at ±3° C. The solution is maintained during the precipitation stage at constant temperature (isothermal procedure) by further distillation of the ethanol.

8 Claims, 1 Drawing Figure

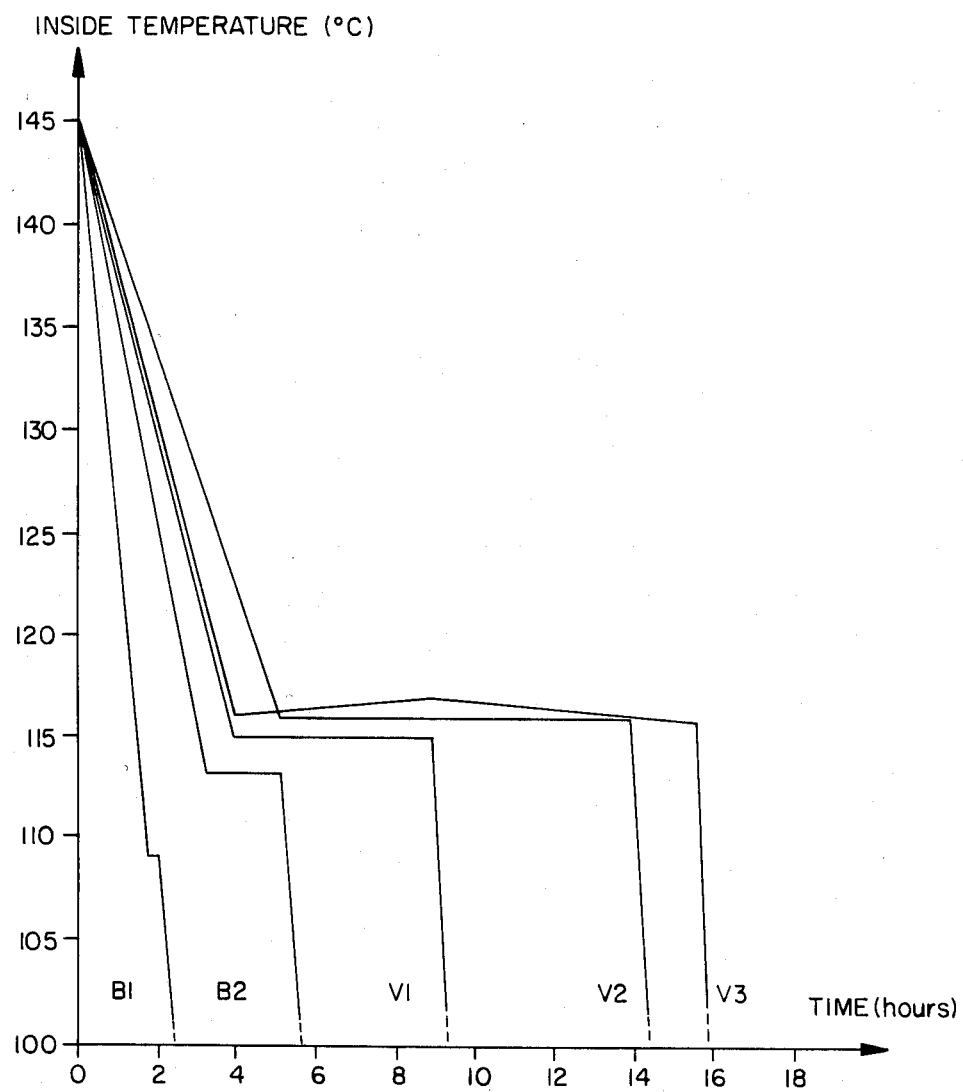
B1 = EXAMPLE 1
B2 = EXAMPLE 2
V1 = COMPARISON EXAMPLE 1
V2 = COMPARISON EXAMPLE 2
V3 = COMPARISON EXAMPLE 3
PLOT: INSIDE TEMPERATURE DURING COOLING AND PRECIPITATION STAGE

PROCESS FOR PREPARING PULVERULENT COATING COMPOSITION BASED UPON POLYAMIDE HAVING AT LEAST 10 ALIPHATICALLY BOUND CARBON ATOMS PER CARBONAMIDE GROUP

CROSS-REFERENCE TO A RELATED APPLICATION

Applicants claim priority under 35 USC 119 for application No. P 35 10 691.3, filed Mar. 23, 1985, in the Patent Office of the Federal Republic of Germany.

BACKGROUND OF THE INVENTION

The field of the present invention is polyamide powders for the coating of metals.

The invention is particularly concerned with methods for the production of pulverulent coating compositions based on polyamides having at least ten aliphatically bound carbon atoms per carbonamide group by the precipitation method. Copolyamides or a mixture of homo- and copolyamides containing at least 70% of the stated components are also useful.

The state of the prior art of producing polyamide powders may be ascertained by reference to U.S. Pat. Nos. 3,476,711; 3,900,607; 3,927,141; 3,966,838; 4,143,025; 4,195,162; and 4,334,056; British Pat. Nos. 535,138 and 688,771; and the Kirk-Othmer "Encyclopedia of Chemical Technology", 2nd Ed., Vol. 16(1968), under the section "Polyamide (Plastics)", pages 88-105, particularly page 92-polylauryllactam (nylon-12), and polyundecanamide (nylon-11), page 101 Solution Processes, and Powder Processing, pages 101-102, the disclosures of which are incorporated herein by reference.

The flame spraying and fluidized bed coating of nylon on a metal base is disclosed in U.S. Pat. No. 3,203,822.

It is known to make use of polyamide based coating compositions to prepare varnish-type coatings on metals. The coating takes place by the melt-film coating method, namely fluidized bed, flame-spraying or electrostatic coating. The polyamide powders are prepared by precipitating the polyamide from solutions as disclosed in British Pat. No. 688,771, or by grinding the polyamide granulate, preferably at low temperatures and in an inert atmosphere.

The precipitation method disclosed in British Pat. No. 688,771 is carried out by the precipitation of polyamide powders from ethanol by cooling the hot polyamide solution by external means or by letting it stand to cool. Powders with a high proportion of fine grains causing dust ejection while in the fluidized bed are obtained solely by cooling or letting stand to cool the hot polyamide solution. Lastly such a procedure also entails undesired agglomerates which subsequently require extra steps of being ground or abraded into the necessary powder size. This precipitation procedure furthermore delivers product batches which are unreproducible, that is, which are different in range of particle size, molecular weight and bulk density.

It is further known to prepare polyamide powders by grinding polyamides of low molecular weights and then raising them to the proper viscosity by heating them to temperatures below the melting point as disclosed in British Pat. No. 535,138 and U.S. Pat. No. 3,476,711.

Again powders of polylauryllactam are prepared by this known method and are used for coating in the manner as disclosed in Chem. Ind., November 1968, pp 783-791, and Modern Plastics, February 1966, pp 153-156. Because polylauryllactam powders do not always meet the requirements of high elasticity, good edge coating, smooth surface, resistance against alkaline aqueous solutions, and because during their processing they frequently tend in particular to emit thick smoke, the most diverse improvements have become known, illustratively polylauryllactam powders containing plasticizers as disclosed in U.S. Pat. No. 3,900,607, or those made of a mixture of homopolylauryllactam and copolyamides containing lauryllactum as disclosed in British Pat. No. 1,392,949, or those containing polyamides with N-alkoxymethyl groups besides acidically reacting catalysts as disclosed in U.S. Pat. No. 3,966,838, or mixtures of polyamides having 8 to 11 aliphatically bound carbon atoms per carbonamide group, aminoplasts bearing alkoxyalkyl groups and acidically reacting catalysts as disclosed in U.S. Pat. No. 3,927,141. While in particular cases these powders evince good properties, they nevertheless fail to meet all the required conditions.

U.S. Pat. Nos. 4,143,025 and 4,195,162 describe an improved process. However, this process still is not entirely satisfactory because a grinding procedure is employed to prepare pigment-free powders and because the precipitation method must be used to prepare pigmented powders. Lastly, the success of this process presumes the use of polylauryllactam granulates which were produced solely by hydrolytic polymerization in the presence of specific amounts of phosphoric acid.

U.S. Pat. No. 4,334,056 describes a further substantially improved process comprising a method of producing polyamide powder from polyamide having a relative viscosity of 1.4 to 1.8 as measured in 0.5% meta-cresol solution at 25° C. and at least 70% of said polyamide consisting of polyamide with at least 10 aliphatically bound carbon atoms per carbonamide group, comprising:

(a) dissolving said polyamide in at least twice the amount by weight of ethanol in a closed vessel at a temperature between about 130° to 150° C. to form a solution of said polyamide;

(b) cooling said solution to a precipitation temperature between about 100° and 125° C. and ceasing said cooling at said precipitation temperature;

(c) precipitating said polyamide powder from said cooled solution of (b) polytropically with agitation and under an inert gas atmosphere; and (d) separating said preciptated polyamide powders of (c) from said ethanol.

Still this process incurs the drawback of relatively long precipitation times and of mechanical properties all of which leave room for improvement.

SUMMARY OF THE INVENTION

Having in mind the limitations of the prior art it is an object of the present invention to provide a process resulting in coating compositions having at least equally good properties, that is, the coating compositions to be deposited in powder form shall offer smooth surface coatings above their film-forming temperature in the absence of interfering thick smoke, good elasticity and excellent resistance against alkaline aqueous solutions. Moreover the above-discussed limitations relating to the necessary process steps of precipitation or grinding, using a homopolylauryllactam of a specified type of preparation, are avoided and, lastly, a substantially shorter time of precipitation of less than two hours is achieved.

The objects of the present invention are achieved by an improvement in the process of U.S. Pat. No. 4,334,056, wherein polyamides containing at least two aliphatically bound carbon atoms per carbonamide group or copolyamides or a mixture of homo- and copolyamides containing at least 70% of the stated components are prepared by the precipitation method in the presence of ethanol as solvent. The solution is prepared at 130° to 150° C. with an adjustment to the temperature of precipitation between 100° and 125° C. and with care being taken to avoid local supercooling without further heat supply and while suppressing boiling in an inert gas atmosphere and at an angular speed of the stirrer corresponding to the grain size of the desired particles, stirring taking place until completion of the particle formation, a polytropic phase with a temperature rise from 0.5° to 3° C. being observed during the precipitation and, lastly, the powder grains obtained from the cooled suspension.

The process of U.S. Pat. No. 4,334,056 according to the present invention is modified in that the hot solution is rapidly cooled to the saturation limit (about 125° C.) while being stirred and ethanol is distilled under its own pressure, and in the ensuing further cooling stage the jacket temperature is adjusted in step with the temperature of the solution while ethanol is distilled off further so that the jacket temperature at most is 3° C. below the inside temperature until the precipitation temperature is set within the range from 90° to 113° C. and, lastly, in that the solution is kept in the isothermal state during the ensuing precipitation stage by further distillation of ethanol.

BRIEF DESCRIPTION OF THE DRAWING

The figure of the drawing is a plot of the inside temperature in degrees Celsius during the cooling and precipitation stage of Examples 1 and 2 of the present invention and Comparison Tests 1 to 3 versus time in hours.

DESCRIPTION OF THE PREFERRED EMBODIMENTS

Applicable polyamides for the process of the present invention are polyundecanoic acid amide, polylauryllactam (11 aliphatically bound carbon atoms per carbonamide group) and polyamides having more than eleven aliphatically bound carbon atoms per carbonamide group, preferably polylauryllactam. Also, the corresponding copolyamides, or mixtures of homo- and copolyamides are useful which contain at least 70% by weight of the stated components. Accordingly, copolyamides can contain as comonomers from 0 to 30% by weight of one or more comonomers such as caprolactam, hexamethylenediamine, 2-methylpentadiamine-(1,5), octamethylenediamine-(1,8), dodecamethylenediamine, isophoronediamine, trimethylhexamethylene diamine, adipic acid, suberic acid, azelaic acid, sebacic acid, dodecanoic diacid, and aminoundecanoic acid. The homo- and copolyamides designated below as polyamides are used in the form of granulate or chips with a relative solution viscosity between 1.4 and 1.8 as measured in 0.5% cresol solution at 25° C. Preferably, the copolyamides are prepared by hydrolytic polymerization. However, it is also possible to employ copolyamides produced by activated anionic or acidolytic polymerization. The polyamides produced by hydrolytic polymerization can be prepared with a controlled or uncontrolled molecular weight, that is, in the absence of any chain stabilizers, such as acetic acid, benzoic acid, adipic acid, azelaic acid, sebacic acid, and dodecanoic diacid.

Advantageously, polylauryllactam is employed which is produced in the presence of 0.3 to 0.7% by weight of phosphoric acid, 2 to 10% by weight water and at temperatures between 265° and 300° C. in the absence of any chain stabilizer and under its own pressure. Phosphoric acid may also be added following the precipitation. The overall content is phosphoric acid may amount to 1% by weight and this proportion may be reached by partial addition as catalyst during the polymerization and as partial addition after the precipitation, or also by a single addition after the precipitation. Appropriately extraction by ethanol or methanol takes place beforehand.

Ethanol is exclusively used as the solvent for the precipitation procedure of the invention. Besides water-free ethanol, ordinary alcohol can be used as ethanol, which contains up to 10% by weight of water and the conventional denaturants such as methylethylketone, petroleum ether and pyridine. The ethanol is used at least in twice the amount of weight of the polyamide. Preferably the amount by weight is from twice to five-fold for fluidized bed powders and from four-fold to seven-fold for electrostatic powders. In particular, the fluidized bed is four-fold and the electrostatic 5.6 fold. In other words, the polyamide concentration in solution is 35% by weight, advantageously 25 to 15, especially 20 to 15% by weight, respectively. For these ranges of concentration, suspensions are obtained which can be well stirred after precipitation and, furthermore, have good heat removal.

To implement the process of the present invention, the mixture of polyamide and ethanol is appropriately raised in jacket-heated agitation vessels to the dissolution temperature which is between about 140° and 150° C., preferably about 145°+/−2° C. The heating rate is not critical. The heating can be implemented by heat transmitting means in the jacket or advantageously using low-pressure steam. High pressure steam can be used where the vessel volumes are large. The stirring rate during the dissolution process does not affect the grain size distribution.

Thereupon the solution is cooled with stirring at jacket temperatures between 122° and 125° C. and essentially by distilling the ethanol at its own pressure. The cold condensate is removed at a rate such that the solution is cooled by at least 10° C. and, preferably, by 20° C. per hour. During this rapid cooling phase the jacket temperature is set lower by no more than 3° C. once a maximum inside temperature (saturation limit) of about 125° C. is reached. Thereby seed formation is prevented at the wall and, furthermore, premature precipitation is avoided.

Beginning with this inside temperature of about 125° C., the jacket temperature is lowered in step with the solution temperature (inside temperature) to the temperature of precipitation, care being paid that in this stage too the jacket temperature is a maximum of 3° C. less than that of the solution. Seed formation in this process takes place mainly within the solution.

Ethanol is distilled also during this stage. Therefore the temperature of precipitation is reduced substantially and independent of the vessel size. It is within the range from 90° to 113°, preferably from 100° to 112° C.

The temperature of precipitation is found by the kink in the cooling curve, where the curve becomes horizontal, as illustrated in the Figure of the drawings. The precipitation stage is substantially less than two hours. In particular, it is within the range of from 5 to 60 minutes, and is preferably carried out isothermally, that is, the heat of crystallization being released is removed merely by the further distillation of ethanol. By "isothermal conditions", as used herein, is meant that the inside temperature during the precipitation stage does not rise by more than 0.3° C. and preferably this temperature difference is a maximum of 0.2° C. The end of the precipitation stage is evident by the strongly dropping inside temperature, kink in the cooling curve, also as shown in the Figure. A maximum of 30% of the polyamide used is present in dissolved form at the end of the precipitation stage. This amount strongly depends on the polyamide composition.

The essentially more rapid precipitation is carried out under inherent pressure. Therefore additional inside pressure to prevent boiling is unnecessary. Surprisingly, the strongly supersaturated solution does not include a solvent at the more rapid precipitation, and rapid growth of grains, and thereby smoother coatings are obtained.

The average grain size and the grain size distribution are determined in the main by the rpm of the stirrer during the cooling and precipitation stage. Suitable stirrers are propeller mixers, blade agitators, anchor agitators and, preferably, paddle mixers with variable angular speeds. The paddle mixer dimensions are such that the ratio of the reactor diameter to the agitator blade diameter is 2:1.

A low rpm is used to prepare fluidized bed powders of which 95% of the grain sizes are between 40 and 250 microns. Preferably the angular speed is raised by 20 to 30 rpm at the beginning of precipitation in order to prevent partial agglomeration of the grains being produced. There should be turbulent flow for the finer electrostatic powders (100% < 100 μm), and this can be achieved by higher stirrer rpm's and by suitable flow interrupting means.

Stirrer rpm's can be used which may be approximately twice those used in the state of the art according to U.S. Pat. No. 4,334,056 for comparable grain size distribution of the powders. After the precipitation stage, jacket cooling is employed without danger of polymer film formation at the reactor wall.

To prevent formation of coarse particles by agglomeration, the suspension is dried up to the product dripping capability which sets at the 20% ethanol moisture at reduced pressure, wall temperatures less than 100° C. and with gentle mechanical motion for instance in slowly moving tumbling or paddle driers. After the product dripping capability is reached, the mechanical motion is made more intense and the drier temperature is raised beyond 100° C. up to 150° C.

The typical average grain size distribution for fluidized bed powders is, therefore, characterized in that at least 99.5% of the polyamide used is present in the range of grain sizes between 40 and 250 microns.

As regards typical grain size distributions of electrostatic powders, 100% of the polyamide used is present in the grain size range below 100 microns.

The process of the present invention therefore allows selective preparation of both fluidized bed and electrostatic powders. When metal substrates are coated, these powders evince excellent properties regarding elasticity and edge coating, and furthermore the coating are resistant to alkaline aqueous solutions.

Moreover the powders so obtained do not smoke during processing. No coarse product is obtained during precipitation. Some coarsening may take place when processing in the drier, but this is an advantage because the properties of fine grains in the fluidized bed powders is reduced further or vanishes entirely for practical purposes. For safety's sake a protective sieve may be installed downstream so that in the case of the fluidized bed powders any proportions larger than 250 microns, and as regards electrostatic powders any portions larger than 100 microns are removed. Any problem-causing proportion of fine grains in the fluidized bed powders are removed for instance in centrifugal wind sieves.

The precipitation is also carried out in the presence of pigments such as titanium dioxide, soot, $BaSO_4$, ZnS, cadmium red, iron oxide or of stabilizers such as 4-hydroxy-3,5-ditert.-butyl-phenyl propionic acid, 4-hydroxy-3,5-di-tert.-butyl-phenyl-propionic acid-hexamethylenediaminebisamide, propionic acid esters having an aliphatic alcohol with 1 to 18 carbon atoms, trisalkylphenyl esters, trisalkyl esters, trisaryl esters, or mixed esters of phosphorous acid of which the alkyl group contains 1 to 16 carbon atoms or is straight-chain or branched, or in the presence of surfactants.

SPECIFIC EXAMPLES

EXAMPLE 1

400 kg of polyamide 12 produced in the presence of 0.5% by weight of phosphoric acid and with an extract content of 0.6% by weight and a relative viscosity of solution of 1.60 are heated together with 2,500 liters of ethanol (denatured by methylethylketone) with a water content of 1% by weight in a 3 cubic meter reactor (diameter: 1,600 mm) to 145° C. Then the jacket temperature is set to 124° C. and the solution is cooled by distilling the ethanol at an agitator angular speed of 50 rpm (paddle mixer, 800 mm diameter) into an external receiver at an average rate of 19° C./hour. From the inside temperature of 125° C., the jacket temperature is regulated so that it is not more than 3° C. below the inside temperature.

At an inside temperature of 109° C., precipitation begins and is made noticeable by a rise of the inside temperature. The agitator angular speed is raised to 70 rpm at the beginning of the precipitation stage and the distillation output is raised so much that at the end of the precipitation, noticeable by a strong drop in the inside temperature, the temperature remains at 109°+/−0.3° C. Precipitation lasts 20 minutes and the amount of ethanol distilled is 650 liters. Thereupon distillation is stopped and the suspension so obtained is cooled by means of the reactor jacket to 45° C. and the product is dried in a paddle drier to a residual moisture of 0.15% by weight.

The grain size distribution measured by means of an image analyzer is as follows:

| Microns | % by Weight |
|---|---|
| <40 | 0.3 |
| <80 | 20 |
| <120 | 80 |
| <160 | 99 |
| <200 | 100 |

Fluidized bed coatings 300 microns thick are prepared with this powder on 1 mm sheetmetal previously heated to 380° C. in a circulating air oven.

The table shows the test results from the Examples and the Comparison Examples. It is noted that powders with good coating properties are obtained for precipitation times less than 2 hours.

EXAMPLE 2

The procedure is the same as in Example 1, however, the cooling rate is set to 10° C./hour. To retain a grain size distribution corresponding to that of Example 1, the angular speed of the stirrer is kept at 35 rpm during the cooling stage. The time of precipitation is 1 hour and 50 minutes at 113° C.

Comparison Example 1

The precipitation time is 5 hours.

Comparison Example 2

The precipitation time is 8 hours.

Comparison Example 3

(Corresponds to Example 1 of U.S. Pat. No. 4,334,056.)

As the inside temperature of 117° C. is reached, the angular speed is set to 20 rpm, the jacket temperature is set to 111.5° C. and the solution is subjected to pressure of 2 bars of nitrogen.

The cooling curves of the Examples and Comparision Examples are shown in the Figure of the drawing.

TABLE

|  | Agitator rpm during the cooling stage | Cooling rate | Precipitation time | Temperature of precipitation °C. | Erichsen depth | Impact depth mm/7.6 kg |
|---|---|---|---|---|---|---|
| Example 1 | 50 | 19° C./hr. | 20 min. | 109 | >10 mm | >1800 |
| Example 2 | 35 | 10 | 1 hr. 50 min. | 113 | >10 | >1800 |
| Comparison Example 1 | 30 | 8 | 5 hours | 115 | <8 | <1000 |
| Comparison Example 2 | 26 | 6 | 8 hours | 116 | 6–8 | <900 |
| Comparison Example 3 | 20 | 8 | 12 hours | 116–117 | <8 | <600 |

What we claim is:

1. In the method of producing polyamide powder from polyamide having a relative viscosity of 1.4 to 1.8 as measured in 0.5% meta-cresol solution at 25° C., and at least 70% of said polyamide consisting of polyamide with at least ten aliphatically bound carbon atoms per carbonamide group comprising:
   (a) dissolving said polyamide in at least twice the amount by weight of ethanol in a closed vessel at a temperature between about 130° to 150° C. to form a solution of said polyamide;
   (b) cooling said solution to a precipitation temperature between about 100° and 125° C.;
   (c) precipitating said polyamide powder from said cooled solution of (b) with agitation and under an inert gas atmosphere; and
   (d) separating said precipitated polyamide powders of (c) from said ethanol; the improvement comprising:
   (e) rapidly cooling said solution of about 130° to 150° C. to a saturation limit of about 125° C. inside temperature with stirring and distillation of said ethanol under its own pressure;
   (f) further cooling said solution below said saturation limit with distillation of said ethanol and cooling with a jacket wherein the jacket temperature is at most 3° C. below said inside temperature up until a precipitation temperature within the range of 90° to 113° C. is reached; and
   (g) maintaining said solution in the isothermal state during the ensuing precipitation stage by further distillation of ethanol.

2. The method of claim 1, wherein said solution is cooled by ethanol distillation at a rate of at least 10° C./hour.

3. The method of claim 2, wherein said jacket temperature during cooling stage (e) is kept between 122° and 125° C. until the inside temperature has reached 125° C. and said jacket temperature in said further cooling stage (f) is matched to said inside temperature until the end of precipitation where said jacket temperature is at most 3° C. below said inside temperature.

4. The method of claim 1, wherein the ethanol concentration of step (a) is two to five times the amount by weight of said polyamide.

5. The method of claim 1, wherein the ethanol concentration of step (a) is four to seven times the amount by weight of said polyamide.

6. The method of claim 4, wherein the ethanol concentration of step (a) is four times the amount by weight of said polyamide.

7. The method of claim 5, wherein the ethanol concentration of step (a) is 5.6 times the amount by weight of said polyamide.

8. A polyamide coating powder obtained by the method of claim 1 having an Ericksen depth test reading greater than 10 mm and an impact depth reading greater than 1800 mm per 7.6 kg.

* * * * *